United States Patent
Bonnedal et al.

(10) Patent No.: US 6,522,460 B2
(45) Date of Patent: Feb. 18, 2003

(54) OPTICAL FIBER AMPLIFIER CONTROL

(75) Inventors: Dag Bonnedal, Enskede (SE); Johan Sandell, Enskede (SE); Gunnar Forsberg, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/759,373

(22) Filed: Jan. 16, 2001

(65) Prior Publication Data

US 2001/0043389 A1 Nov. 22, 2001

Related U.S. Application Data

(63) Continuation of application No. PCT/SE99/01285, filed on Jul. 16, 1999.

(30) Foreign Application Priority Data

Jul. 17, 1998 (SE) .............................................. 9802585

(51) Int. Cl.[7] .............................. H01S 3/00; H04B 10/17
(52) U.S. Cl. ............. 359/341.42; 359/160; 359/337.11; 359/341.3
(58) Field of Search ................... 359/160, 337.11, 359/341.3, 341.41, 341.42

(56) References Cited

U.S. PATENT DOCUMENTS

| | | | |
|---|---|---|---|
| 5,374,973 A | | 12/1994 | Maxham et al. |
| 5,479,423 A | | 12/1995 | Tanikawa |
| 5,703,711 A | * | 12/1997 | Hamada ...................... 359/341 |
| 5,841,571 A | * | 11/1998 | Terahara ..................... 359/341 |
| 5,870,217 A | * | 2/1999 | Itou et al. .................... 359/179 |
| 5,875,054 A | * | 2/1999 | Onoda et al. ................ 359/341 |
| 6,215,583 B1 | * | 4/2001 | Lageratröm et al. ........ 359/341 |
| 6,246,514 B1 | * | 6/2001 | Bonnedal et al. ........... 359/341 |

FOREIGN PATENT DOCUMENTS

| | | |
|---|---|---|
| GB | 2289586 A | 11/1995 |
| GB | 2294170 A | 4/1996 |
| WO | 98/11681 | 3/1998 |
| WO | 98/11682 | 3/1998 |

* cited by examiner

*Primary Examiner*—Nelson Moskowitz
(74) *Attorney, Agent, or Firm*—Nixon & Vanderhye, PC

(57) ABSTRACT

An optical fiber amplifier has a length of active optical fiber into which pump light from a pump laser is injected. The pump laser is locally controlled by a laser monitor diode, the pump laser and the laser monitor forming a pump laser module. The overall amplification of the amplifier is controlled by two control loops: a feed forward loop and a feed back loop. These two control loops also control the pump laser. The feed forward loop gives a fast response and receives an input signal from an input monitoring diode. The feed back loop gives a slower response and sets the overall gain of the amplifier. The feed back loop receives an input signal from an output monitoring diode. In the feed forward loop, the input power level is biased and controlled by a set offset values from sources to provide a signal corresponding to a pump power reference level which maintains the desired gain. The offsets of characteristic curves indicating an overall behavior of the optical amplifier. The pump power reference level is further modified in accordance with the pump monitor signal locally controlling the pump laser. This gives a very fast and accurate control in spite of the non-linear behavior of the optical fiber amplifier.

21 Claims, 3 Drawing Sheets

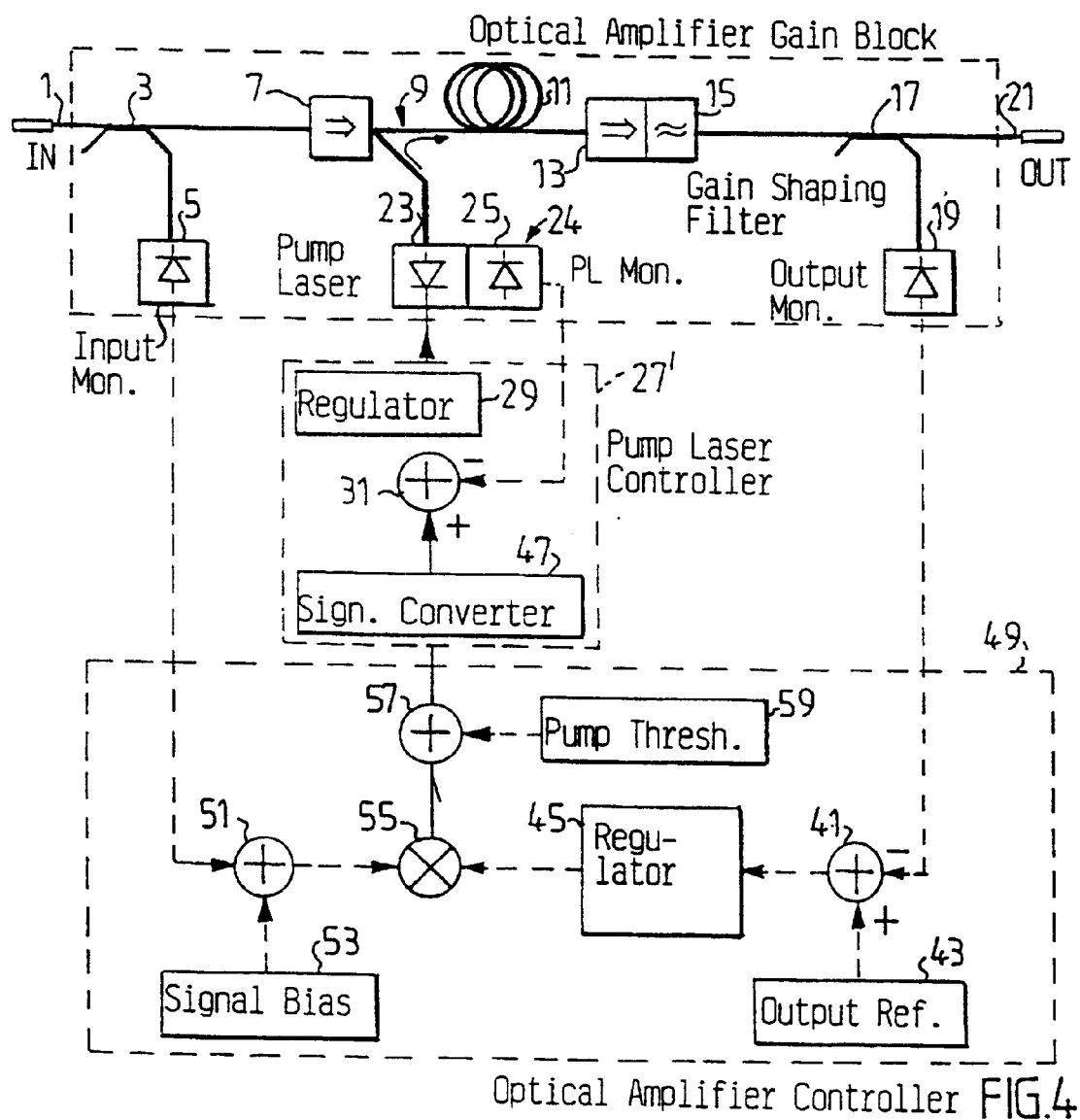
Optical Amplifier Controller FIG.4
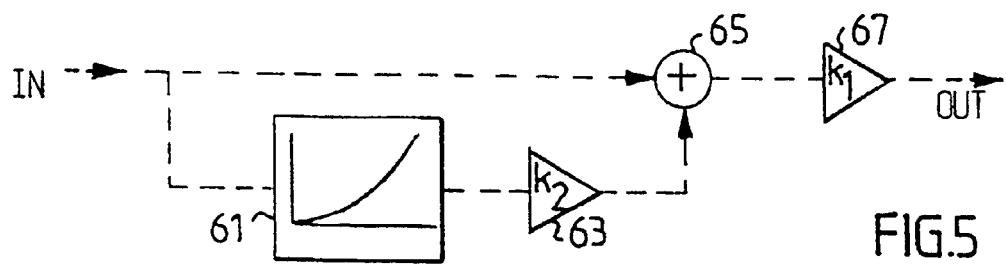
FIG.5

US 6,522,460 B2

OPTICAL FIBER AMPLIFIER CONTROL

This application is a continuation of PCT/SE99/01285 filed Jul. 16, 1999.

TECHNICAL FIELD

The present invention relates to an optical fiber amplifier having variable gain to be used in particular in a WDM network, and also to a WDM network and a method of amplifying WDM light signals.

BACKGROUND OF THE INVENTION AND STATE OF THE ART

Optical fibers are presently widely used for communicating information such as in large telecommunication systems, primarily owing to their large reliability, their insensitivity to electrical interference and their high capacity. Of course, there is a desire in the existing telecommunication networks to use the available optical fibers in their networks as efficiently as possible, in particular for communication over long distances, since such fibers obviously have high installation costs. By introducing wavelength division multiplexing WDM in existing communication systems using optical fibers and in new communication systems to be built a plurality of individual wavelength channels can be transmitted on the same optical is fiber and thus the information transmitted over the fiber can be multiplied. In wavelength division multiplexing a plurality of optical signals, each on a separate wavelength channel, are simultaneously, in parallel to and independently of each other, transmitted on an optical fiber.

In optical fiber networks for example for long distance communication there may be a need for amplifying and/or regenerating the optical signals. Such amplification can of course be achieved by a repeater built in a straight-forward way, including components converting the optical signals to electrical signals, amplifying the electrical signals and converting the electrical signals to optical signals. For WDM signals this will require one optoelectrical and one electrooptical converter per wavelength channel used in the WDM transmission and also one filter or demultiplexer for filtering out the different wavelengths in the incoming signal. This will obviously be very costly and also results in reliability problems owing the large number of components, both electronic and optical, which are required.

Another type of amplifier comprises optical fiber amplifiers based on optical fibers doped with rare-earth metals, primarily erbium-doped fiber amplifiers. Such amplifiers have great advantages when used in optical fiber systems owing to e.g. their compatibility with the optical fibers and their high gain, and they are in particular advantageous when used in wave-length multiplexed transmission systems, since they are capable of simultaneously amplifying a number of WDM channels and only require a limited amount of electronic components. The basic design of an erbium-doped fiber amplifier includes one length of an active, erbium-doped optical fiber, connected at its input end to the output of a 2-to-1 optical coupler, the coupler receiving on one of its inputs the signal to be amplified and on the other input more energetic light providing the power for amplifying the signal. This more energetic input light is called the pump light and is obtained from an optical power source, called the optical pump. The pump light has a shorter wavelength than that of the signal and is generally more energetic and is capable of lifting erbium ions from lower energy states to higher energy states in the erbium-doped fiber. Light is then generated in the fiber when the ions return to lower energy levels.

In order to achieve the best possible transmission properties the power of all wavelength channels must on each considered point along the whole transmission path be kept equal to each other. In particular it is generally a strict requirement that the optical transmission must perform equally well irrespectively of which channels are present at each point and of the number of channels which are present at each point. Hence, it is usually optimal to have a constant output power per optical channel in an optical amplifier included in optical network. Further, the gain of an optical amplifier must be maintained in the cases where wavelength channels are added to or dropped on the input line of the optical amplifier. Otherwise this will cause, in an optical fiber amplifier which is normally operated in a saturated condition, implying that it has an approximately constant output power independent of the input power, transients in the power levels of the incoming channels to which a channel is added or of the remaining channels after dropping a channel respectively.

Thus, the output power of an amplifier employed in a network must be controlled as efficiently as possible. Prior methods are disclosed in Swedish patent No. 506 403, Swedish patent application No. 9603336-0 corresponding to published International patent application WO98/11682, the International patent application No. PCT/SE98/0255, and the International patent application No. PCT/SE99/00556 corresponding to Swedish patent application No. 9801159-6, filed Apr. 1, 1998. A commonly used method of controlling an optical fiber amplifier is to vary the optical pump power by regulating the current flowing in the pump laser diode. However, due to internal delays in such an amplifier it is difficult to construct an efficient and fast control using only a feedback loop, see e.g. the cited International patent application No. PCT/SE99/00556. Still, it is a well-known fact that a feed forward loop can be very efficient in providing a fast control in a regulated system provided that the transfer function of the system is accurately known. The gain of an optical fiber amplifier is not a linear function of the pump power and furthermore, the optical pump power supplied from a pump laser is not a linear function of the current supplied to the laser, the bias current.

A pump laser diode is a very fast non-linear device and thus a local feedback loop can be used to regulate the pump power. The signal from the monitor photodiode which is normally available at the rear facet of the laser diode within a pump laser module or package can be used as a feedback signal for this regulating loop. Still this monitor signal is not fully proportional to the optical pump power fed to the optical fiber amplifier.

An optical amplifier is disclosed in U.S. Pat. No. 5,374, 973 comprising the conventional components such as a pump power monitor and an output power feedback loop. No provisions are made to compensate for non-linearities in the essential elements of the amplifier, i.e. in the amplifying optical fiber, the pump laser and the monitor diode.

As disclosed in the cited Swedish patent application No. 9603336-0 a good amplifier control can be achieved by combining feed forward and feed back loops. The feed forward loop includes a non-linear element using, in the disclosed embodiment, A/D-conversion, a stored table of numeric values modifying the control digital signal and then D/A-conversion. However, it is difficult to derive the optimal characteristics of this non-linear element, i.e. the table, from measurements on the amplifier. It may also be desired to implement them in hardware in the loop avoiding the A/D- and D/A-conversions. Furthermore, the accuracy of the control is limited by this model and the non-linearities of the pump laser, resulting in a less than optimal performance of the amplifier.

SUMMARY

It is an object of the invention to provide an optical amplifying device having a gain which can be accurately controlled and in particular be maintained at an accurate constant value.

It is another object of the invention to provide an optical amplifier having a controllable accurate gain which can be readily built in hardware.

The problem solved by the invention is thus how to construct an optical amplifier which has a constant gain irrespectively of the input signal power, where the amplifier has a construction suited to be built of hardware and the construction requiring only specific, definite measurements on the amplifier and its pump laser and pump laser monitor.

Thus, an optical amplifying device comprises an active fiber length, a pump laser included in a pump laser module also including a monitoring diode, and further two control loops, a feed forward loop and a feed back loop. In the feed forward loop the input power level is modified to a signal corresponding to or substantially agreeing with the pump power which maintains the desired gain, then adding or subtracting suitable signals to compensate for offsets. The pump power level obtained by the modifying is then converted to correspond to or agree with or to have a similar behaviour as the pump monitor signal which is used as the set value in the local pump laser regulating loop of feed back type. This second conversion can also be used for any control signal or control device providing a control signal to the pump laser irrespectively of the type of control used.

The advantage of the proposed control is that it provides a very fast and accurate control scheme for such an inherently non-linear and complicated device as an optical fiber amplifier. The parameters required for implementing the control scheme are directly given by making some definite measurements on the amplifier and its pump laser module.

BRIEF DESCRIPTION OF THE DRAWINGS

The invention will now be described by way of a non-limiting embodiment with reference to the accompanying drawings, in which:

FIG. 4 is a block diagram of an embodiment of an optical amplifier having a full amplifier control allowing fast and accurate control of the output power of the amplifier, FIG. 5 is a block diagram of an embodiment of a signal converter used in the full amplifier s control scheme of FIG. 4.

DETAILED DESCRIPTION

Figure 7:
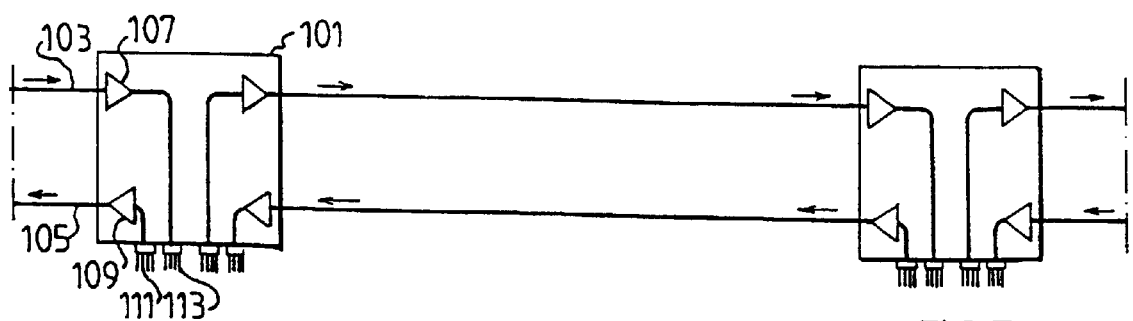
FIG. 7 is a diagram illustrating a portion of an optical fiber network.

In FIG. 7 a portion of an optical fiber WDM network is shown having nodes 101. Each node is connected to another node through one input fiber 103 and one output fiber 105. The input fibers are connected to preamplifiers 107 and the output fibers are connected to booster or power amplifiers 109. The preamplifiers 103 and the boosters 109 are in turn connected to electrical output and input ports 111, 113 respectively which comprise demultiplexer and multiplexers (couplers) respectively. It may be required to set the amplifiers 107, 109 to have suitably adapted gains depending on the purpose of the amplifier and it may also be required to change the gain during operation of the network.

Figure 6:
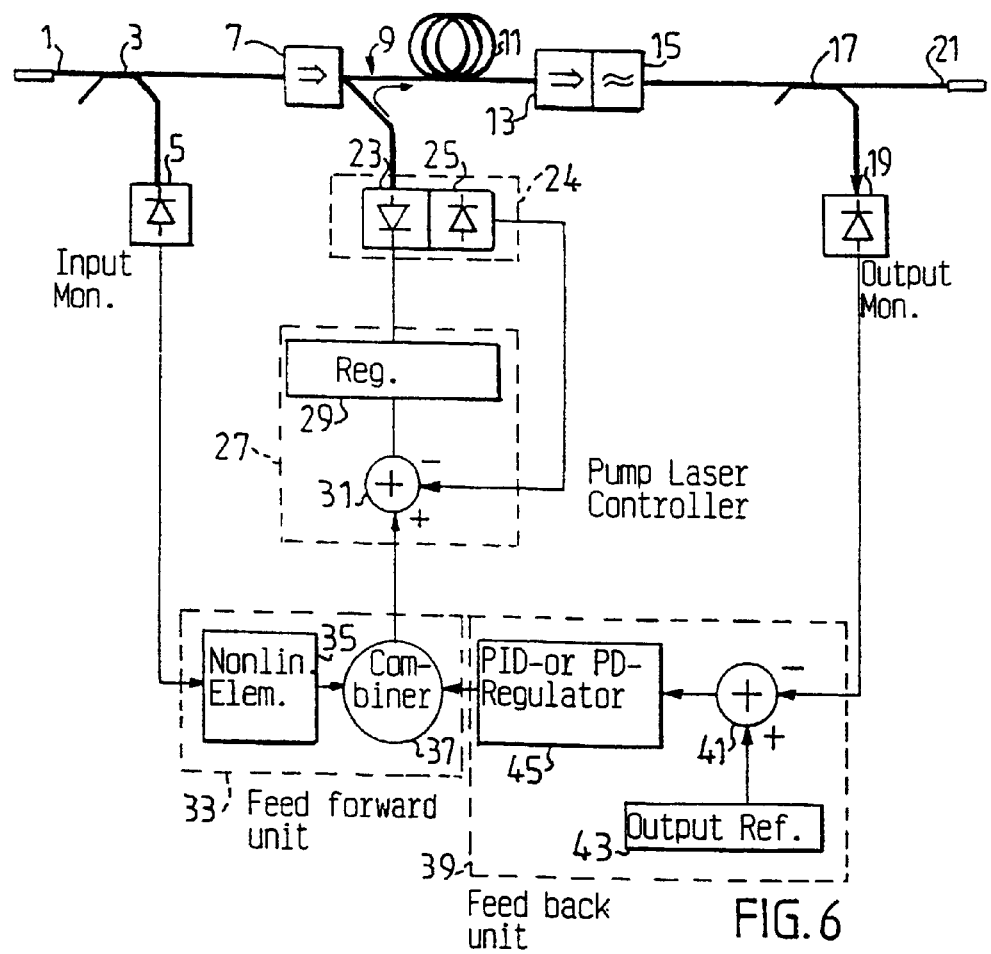
FIG. 6 is a block diagram of an embodiment of an optical amplifier according to prior art having both a feed forward control and a feed back control.

An optical amplifying device suitable for amplifying WDM light signals in a node 101 of the network portion illustrated in FIG. 7, the optical amplifying device being constructed basically as disclosed in the cited Swedish patent application No. 9603336-0, is illustrated by the block diagram of FIG. 6. The light carrying the WDM channels to be amplified arrives on an optical fiber 1. A small portion of the total incoming light power is tapped off in a power splitter 3 transmitting the small portion to an input monitor 5 such as PIN diode sensing the total optical power of the tapped-off light. The remaining large portion of the light power propagates to an optical isolator 7, is combined with pump light in an optical combining coupler 9 and the combined light waves then propagate through the active optical fiber length 11 having a doping such as of erbium. The original light wave which carries the WDM channels is amplified in the active fiber, passes then through another optical isolator 13 and therefrom to a gain shaping filter 15 equalizing the gain for the different WDM-channels. Finally a small portion of the total light power is again tapped in a power splitter 17, from which the small portion propagates to an output monitor 19 sensing the tapped-off light power. The remaining large portion of the light signal therefrom propagates from the amplifier on an output fiber 21.

The pump light is produced in a pump laser diode 23 incorporated in a pump laser module 24 also including a pump laser monitor diode 25 sensing the output power of the pump laser 23. The pump laser 23 is supplied with electrical current from a pump laser controller block 27 and a regulator 29 therein. The regulator 29 obtains a control signal from a signal adding circuit 31 receiving a signal from a signal feed forward unit 33 and the output signal of the pump laser monitor diode 25, the latter signal with a negative sign so that is subtracted from the output signal of the feed forward unit 33. The circuit elements including the pump laser monitor 25, the regulator 29 and the adding circuit 31 constitute a negative feed back loop for maintaining the output power level of the pump laser diode 23 substantially constant.

The feed forward block 33 receives a control signal from the input monitor 5, this signal representing the input light power of the total optical amplifying unit. This control signal is shaped in a non-linear element 35 to have its characteristic modified and the shaped signal is input to a combining element 37. The combining element 37 also receives as input a signal produced by a standard feed back unit 39 controlling in a feed back way the overall amplification of the total optical amplifier, the feed back unit 39 in turn receiving as an input signal the output signal of the output monitor 19, this signal representing the output power of the total optical amplifying device. The output monitor signal is thus provided to an inverting input of a summing device 41 in the feed back unit 39, which summing device on a non-inverting input receives an output reference signal from an output reference source 43. The is added signal output from the summing circuit 43 is through a regulator 45 of the PID- or PD-type provided as a second input signal to an input of the combining device 37. The combined signal combined in the combining device 37 which can be a sum or a product of the input signals is the control signal input to the adding circuit 27 of the pump laser controller 27.

The optical amplifying device of FIG. 6 thus contains two control loops. A slow feedback loop is designed to give a stable output power and comprises the output monitor 19, the second summing device 41 together with the reference source 43 and the regulator 45. A fast forward loop has a linearizing function to give a stable gain for fast input transients and comprises the input monitor 5, the non-linear element 35 and the signal combiner 37. The regulator 29 in the pump laser controller block 27 can comprise conventional PI or PID controlling circuits.

Thus, providing both a feedback loop and a feed forward loop can be very efficient in providing a fast and accurate control for a an optical fiber amplifier having internal delays, as suggested in the cited Swedish patent application No. 9603336-0. The design of in particular the feed forward loop presupposes that the transfer function of the system is accurately known. However, the gain of the basic components of an optical fiber amplifier, i.e. of the structure including the pump laser 23, the coupler 9 and the active fiber 11, is not a linear function of the power of light issued by the pump laser and furthermore, the optical pump power issued by the pump laser 11 is not a linear function of the electrical current supplied to the pump laser. A pump laser diode is a non-linear device having a very fast response and thus a local feedback loop, here including the pump laser monitor 25, the summing circuit 31 and the regulator 29, is conventionally used to regulate the power of light emitted by the pump laser 23, the feed back loop feeding back the signal from the pump laser monitor 25.

However, it appears that it may be difficult to derive the optimal characteristics of the non-linear element 35 from measurements on the amplifier and have it work sufficiently fast, e.g., using basically analog hardware in the fast forward loop. The accuracy of the overall control of the total optical amplifying device is limited by the model and the non-linearities of the pump laser, which can result in less than optimal performance of the total amplifier.

However, it appears that it may be difficult to derive the optimal characteristics of the non-linear element 35 from measurements on the amplifier and have it work sufficiently fast, e.g. using basically analog hardware in the fast forward loop. The accuracy of the overall control of the total optical amplifying device is limited by the model and the non-linearities of the pump laser, what can result in a less than optimal performance of the total amplifier.

In order to achieve an efficient feed forward loop firstly the input power level should be converted to the pump power which maintains the desired gain and secondly this pump power level should be converted to the corresponding pump monitor signal level to be used as the set value in the pump regulating loop.

Figure 1:
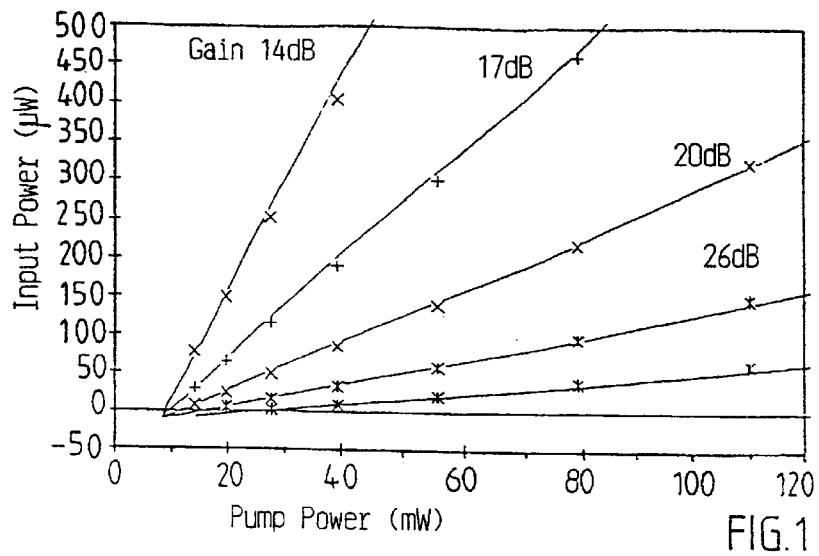
FIG. 1 is a diagram illustrating relations between signal input power and pump power while maintaining a constant gain for a typical erbium doped fiber optical amplifier.

The first signal conversion step can be based on information obtained from measurements, as illustrated in FIG. 1, on the amplifier gain block, i.e. on the basic amplifier structure including the pump laser 23, the coupler 9 and the active fiber 11, see FIG. 6. Here, the relation between the level of the input signal power and a corresponding pump power while maintaining a constant, arbitrary amplifier gain is shown. The symbols (crosses) are is measured values and the plotted lines constitute one possible two-dimensional model of the relation. It is readily visible that all gain curves of the model are substantially straight and converge to one point through which substantially all of them pass or from which substantially all of them extend. This point can be termed an offset origin of the gain curves, the offset point being offset from the real origin by both a signal offset and a pump offset.

From this information it is possible to design the amplifier and its control block principally as illustrated in the block diagram of FIG. 4. In FIG. 4 a modified optical amplifying device is illustrated having an efficient and fast gain control requiring some basic measurements on the basic or core structure of the optical amplifier, the pump laser an its monitoring diode, The pump laser 23 is in FIG. 4 supplied with electrical current from a modified pump laser controller block 27' which also comprises a signal converter 47. The signal converter block 47 of the pump laser controller 27' has its output terminal connected to the summing circuit 31 of the pump laser controller instead of the output terminal of the combining circuit 37 of FIG. 6. Thus, the adding circuit 31 receives as input signals the output signal of the signal converter 47 and with a negative or inverted sign the output signal of the pump laser monitor 25.

The pump laser controller block 27' receives as a signal input to the signal converter 47 a control signal or amplifier control signal, from a controller block 49 controlling all of the optical amplifier. The optical amplifier controller 49 receives as a first input signal the output signal of the input monitor 5, this signal representing the input light power of the optical amplifier. It receives as a second input signal the output signal of the output monitor 19, this signal representing the output power of the total optical amplifier. The first input signal is fed to an input of a first summing device 51, which on its other input receives a signal bias from a signal bias source 53. The resulting added signal is provided to an input of a multiplying circuit 55. The second input signal of the optical amplifier controller block 49 is provided to an inverting input of a second summing device 41, which on another but non-inverting input receives an output reference signal from an output reference source 43, in the same way as in the feed back unit 39 of FIG. 6. The added signal output from the second summing circuit 41 is through a regulator 45 provided as a second input signal to an input of the multiplying device 55. The signal representing the product is delivered on the output of the multiplying device 55 as an input signal to an input terminal of a third summing device 57 which on another input received a signal indicating a pump threshold level from a pump threshold setting device 59. The output signal of the third summing circuit 57 is at the same time the output signal of the whole optical amplifier controller block 49 and is supplied to the signal converter 47 in the pump laser controller block 27'.

Thus, also here the optical amplifier block 35 contains two control loops. A slow feedback loop is designed to give a stable output power and comprises the output monitor 19, the second summing device 41 together with the reference source 43 and the regulator 45. A fast forward loop has a linearizing function to give a stable gain for fast input transients and comprises the input monitor 5, the first summing device 51 and the signal bias source 53. The regulator 45 in the optical amplifier control block 35 and the regulator 29 in the pump laser controller block 27 can comprise conventional PI or PID controlling circuits like the amplifier design of FIG. 6. In the forward loop the feed forward signal from the input signal monitor 5 is added to the signal bias from the signal bias source 53, the signal bias having an order of magnitude of 10 µW, this value corresponding to the ordinate value of but having a sign opposite to that of the converging point discussed in conjunction with FIG. 1. The desired amplifier gain is in the conventional way chosen by an output reference signal from the output reference source 43 in the slow feed back loop in which loop a conventional regulator output provides a multiplication factor to be multiplied by the feed forward signal produced by the fast loop. Finally, a pump threshold value from the pump threshold source 59, in the order of 10 µW, is added and corresponds to the abscissa value of the converging point of the lines shown in FIG. 1.

Figure 2:
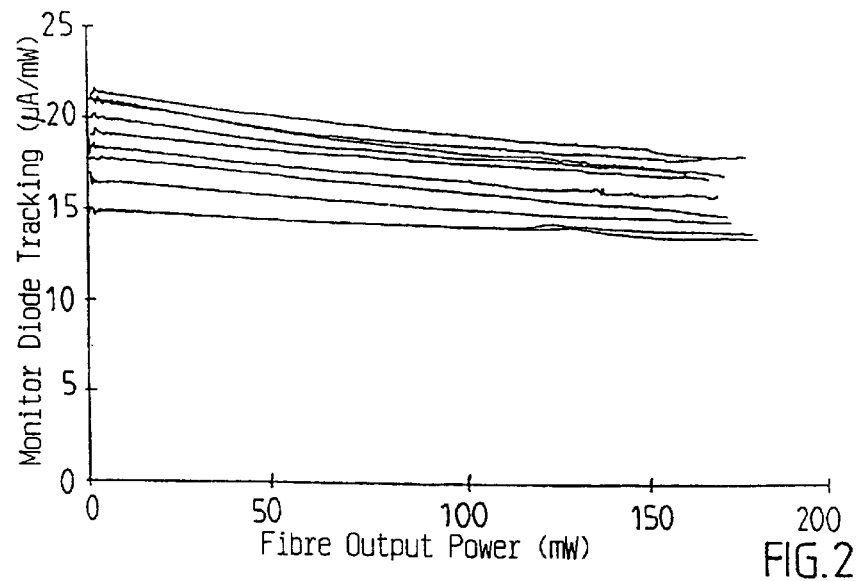
FIG. 2 is a diagram of monitor diode tracking coefficients as functions of the power of light output from a pump laser for a number of pump laser modules from a first manufacturer.
Figure 3:
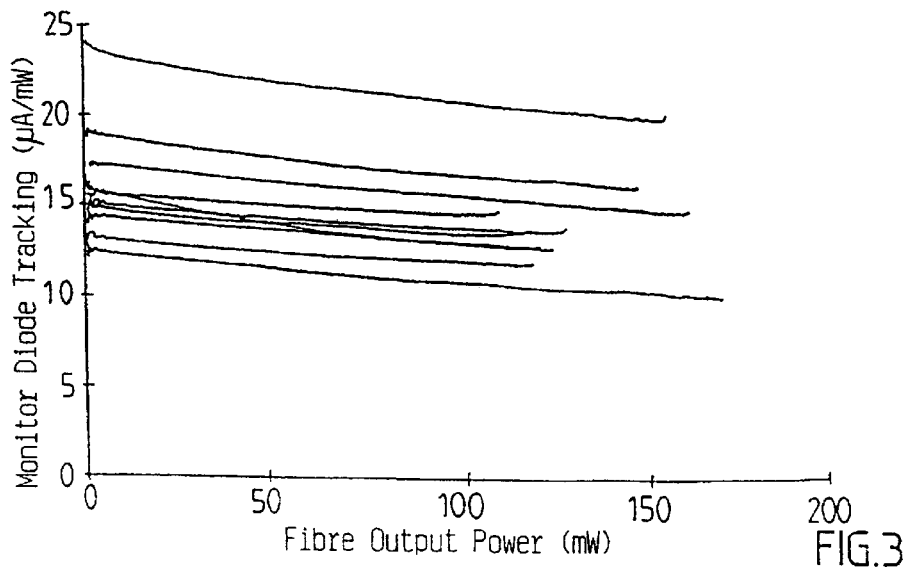
FIG. 3 is a diagram similar to that of FIG. 2 for a number of pump laser modules from a second, different manufacturer,.

The pump power reference value thus provided by the amplifier controller is then to be converted to a pump laser monitor signal reference value in the signal converter 47 in the pump laser control block 27' making the converted signal have a behaviour similar to that of the feed back signal of the pump laser module 24. This can be done based on information contained in the curves in the diagrams of FIGS. 2 and 3.

By testing a number of pump laser modules obtained from different manufacturers it is observed that the non-linearities of the monitor diode response are rather uniform and predictable. The ratio of the monitor diode signal and the output power delivered to the fiber from the entire pump module is called the Monitor Tracking Coefficient. If this quantity is plotted as a function of the total output power, as in the diagrams of FIGS. 2 and 3, it is evident that the relation is linear and thus the monitor signal can be modelled as a second order polynomial. It is further apparent that the slope of the Monitor Tracking Coefficient, i.e. the second order coefficient of the monitor signal, is of the same magnitude both within batches of pump modules from the same manufacturer and for batches from different manufacturers. Even a standard default slope parameter in the regulating circuit would considerably improve the accuracy of the control of the amplifier.

The signal converter 47 in FIG. 4, converting the pump reference signal obtained from the optical amplifier controller 49 to a pump monitor reference value, can thus be implemented as illustrated in the block diagram of FIG. 5 comprising a device 61 for squaring the incoming signal. The squared signal is then amplified in a first amplifier 63 by a gain $k_2$. The amplified signal is added to the incoming signal in a summing circuit 65, which on its output provides a signal which is first amplified by a factor $k_1$ in a second amplifying element 67 and then delivered as the output signal of the signal converter 47. The coefficient $k_2$ corresponding to the gain in the first amplifier 63 is of the order of magnitude of 1 $W^{-1}$ and the gain coefficient $k_1$ of the second amplifier 67 at the output of the converter 47 is often comprised within the range of 10 to 30 µA/mW.

All signal processing can be implemented as analog electronic circuits or if desired as digital circuits or some combination thereof. For example, the signal from the input monitor diode 5 can be amplified in a logarithmic amplifier, not shown, then converted to digital form and in digital shape supplied to the signal converter, which uses a numerical table and makes interpolations therein to produce both the correct shape of the output signal and then also the conversion from a logarithmic representation to the linear one used by regulator 29. Suitable other A/D-circuits and D/A-circuits must then also be connected at appropriate places which are readily selected by one skilled in the art.

The control for the basically non-linear optical fiber amplifier as described herein is very fast and accurate. The parameters required for implementing the control scheme are readily measurable on the amplifier and its pump laser module.

What is claimed is:

1. An optical amplifying device providing output amplified light, the optical amplifying device comprising:
    an optical fiber amplifier;
    a pump laser;
    a pump controller for controlling the pump laser;
    a feed forward loop; and
    a feed back loop;
    wherein the feed forward loop and the feed back loop are coupled to provide a control signal to the pump laser controller for stabilizing amplified light output from the optical amplifying device, and
    wherein the feed back loop is arranged to set a gain of the optical fiber amplifier and the feed forward loop is arranged to compensate for an offset in one or more gain characteristic curves of the optical fiber amplifier.

2. The optical amplifying device of claim 1, wherein the feed forward loop comprises a first adding circuit having first and second input terminals, the first adding circuit receiving on the first input terminal a signal indicating power of light incoming to the optical amplifying device and the adding circuit further receiving on the second input terminal a constant signal representing a compensation of an offset of the gain characteristic curves as functions of power of pump light issued by the pump laser, the offset being taken as a value of the gain of the optical fiber amplifier at a point from which substantially all of the one or more gain characteristic curves extend or start.

3. The optical amplifying device of claim 2, further comprising a multiplying circuit having first and second input terminals, the multiplying circuit receiving on its first input terminal an output signal of the first adding circuit and the multiplying circuit further receiving on its second input terminal a feed back signal from the feed back loop, the feed back signal setting the gain of the optical fiber amplifier, the control signal being obtained from an output terminal of the multiplying circuit.

4. The optical amplifying device of claim 3, further comprising a second adding circuit connected so that the amplifier control signal is obtained from the multiplying circuit through the second adding circuit which has first and second input terminals, the first input terminal being connected to receive an output signal from the multiplying circuit and the second input terminal being connected to receive a constant signal representing an offset of the gain characteristic curves as functions of power of pump light issued by the pump laser, the offset being taken as a value of the power of pump light issued by the pump laser at the point from which substantially all of the one or more gain characteristic curves extend or start.

5. An optical amplifying device comprising:
    an optical fiber amplifier;
    a pump laser module including a pump laser and a pump laser monitor;
    a pump laser controller for receiving a monitor signal from the pump laser monitor and controlling the pump laser in accordance with the monitor signal; and
    a control loop configured to provide an amplifier control signal to the pump laser controlling unit for stabilizing an output for the optical amplifying device;

wherein the pump laser controller includes a signal converter arranged to convert the amplifier control signal to an output signal having a characteristic curve as a function of a signal incoming to the signal converter which substantially agrees with a characteristic curve of the monitor signal as a function of a power of light output from the pump laser module.

6. The optical amplifying device of claim 5, wherein the control loop comprises a feed forward loop and a feed back loop.

7. The optical amplifying device of claim 5, wherein the characteristic curve of the signal converter corresponds to a second order polynomial.

8. A fiber optical network for transmitting optical signals, the fiber optical network comprising fiber optical links coupled to at least one optical amplifying device, the at least one optical amplifying device including:
   an optical fiber amplifier;
   a pump laser;
   a pump laser controller for controlling the pump laser;
   a feed forward loop;
   a feed back loop; and
   wherein the feed forward loop and the feed back loop are coupled to provide control signal to the pump laser controller for stabilizing amplified light output from the optical amplifying device,
   wherein the feed back loop is arranged to set a gain of the optical fiber amplifier, and
   wherein the feed forward loop is arranged to compensate for an offset in one or more gain characteristic curves of the optical fiber amplifier.

9. The fiber optical network of claim 8, wherein the feed forward loop of the at least one optical amplifying device comprises a first adding circuit having first and second input terminals, the first adding circuit receiving on the first input terminal a signal indicating power of light incoming to the at least one optical amplifying device and the adding circuit further receiving on the second input terminal a constant signal representing a compensation of an offset of the gain characteristic curves as functions of power of pump light issued by the pump laser of the least one optical amplifying device, the offset taken as a value of the gain of the optical fiber amplifier of the least one optical amplifying device at a point from which substantially all of the gain characteristic curves extend or start.

10. The fiber optical network of claim 9, wherein the least one optical amplifying device further comprises a multiplying circuit having first and second input terminals, the multiplying circuit receiving on its first input terminal an output signal of the first adding circuit of the least one optical amplifying device and the multiplying circuit further receiving on its second input terminal a feed back signal from the feed back loop of the least one optical amplifying device, the feed back signal setting the gain of the optical fiber amplifier, the amplifier control signal being obtained from an output terminal of the multiplying circuit of the least one optical amplifying device.

11. The fiber optical network of claim 10, wherein the least one optical amplifying device further comprises a second adding circuit connected so that the amplifier control signal is obtained from the multiplying circuit of the least one optical amplifying device through the second adding circuit which has first and second input terminals, the first input terminal being connected to receive an output signal from the multiplying circuit of the least one optical amplifying device and the second input terminal being connected to receive a constant signal representing an offset of the gain characteristic curves as functions of power of pump light issued by the pump laser of the least one optical amplifying device, the offset being taken as a value of the power of pump light issued by the pump laser of the least one optical amplifying device at the point from which substantially all of the gain characteristic curves extend or start.

12. A fiber optical network for transmitting optical signals, the fiber optical network comprising fiber optical links connected to at least one optical amplifying device, the at least one optical amplifying device comprising:
   an optical fiber amplifier;
   a pump laser module including a pump laser and a pump laser monitor;
   a pump laser controller for receiving a monitor signal from the pump laser monitor and controlling the pump laser in accordance with the monitor signal; and
   a control loop configured to provide a control signal to the pump laser controlling unit for stabilizing the output of the optical amplifying device;
   wherein the pump laser controller includes a signal converter arranged to convert the control signal to an output signal having a characteristic curve as a function of a signal incoming to the signal converter substantially in accordance with a characteristic curve of the monitor signal as a function of a power of light output from the pump laser module.

13. The fiber optical network of claim 12, wherein the control loop comprises a feed forward loop and a feed back loop.

14. The fiber optical network of claim 12, wherein the characteristic curve of the signal converter corresponds to a second order polynomial.

15. A method of amplifying optical signals, the method comprising:
   providing the optical signals to an active optical fiber;
   injecting pump light from a pump laser into the active optical fiber;
   monitoring the power of incoming light to produce a feed forward signal representing the power of incoming light;
   monitoring power of outgoing light to produce a feed back signal representing the power of outgoing light; and
   controlling the pump laser dependent on the feed forward signal and the feed back signal such that the feed forward signal compensates for offsets in one or more gain characteristic curves of an optical fiber amplifier, the feed forward signal and the feed back signal stabilize the output of the optical fiber amplifier, and the feed back signal sets a gain of the optical fiber amplifier.

16. The method of claim 15, wherein controlling the pump laser comprises:
   adding the feed forward signal and a constant signal representing a compensation of an offset of the gain characteristic curves as functions of power of pump light issued by the pump laser to produce a first added signal, the offset taken as a value of the gain of the optical fiber amplifier at a point from which substantially all of the gain characteristic curves extend or start, and using the first added signal for the control.

17. The method of claim 16, wherein controlling the pump laser comprises:
   multiplying the first added signal and the feed back signal to produce a multiplied signal and using the multiplied signal for the control.

18. The method of claim 17, wherein controlling the pump laser comprises:

adding the multiplied signal and a constant signal representing an offset of the gain characteristic curves as functions of power of pump light issued by the pump laser to produce a second added signal, the offset being taken as a value of the power of pump light issued by the pump laser at the point from which substantially all of the gain characteristic curves extend and/or start, and using the second added signal for the control.

19. A method of amplifying optical signals, the method comprising:

providing the optical signals to an active optical fiber;

injecting pump light from a pump laser into the active optical fiber;

sensing power of the pump light to produce a sensed power signal;

controlling the pump light in accordance with the sensed power signal to give the pump light a constant power;

producing a control signal to stabilize amplifying of the optical signals;

converting the control signal to a converted control signal having a characteristic curve as a function of a signal incoming to the signal converter substantially agreeing with a characteristic curve of the sensed power signal as a function of power of light output from the pump laser; and providing the converted control signal to the pump laser.

20. The method of claim 19, wherein producing the control signal includes producing a feed forward signal and a feed back signal.

21. The method of claim 19, wherein the characteristic curve of the converted control signal comprises a second order polynomial.

* * * * *